United States Patent [19]

McMullen et al.

[11] 4,361,047
[45] Nov. 30, 1982

[54] DIFFERENTIAL PRESSURE TO ELECTRICAL SIGNAL TRANSDUCER

[75] Inventors: Raymond F. McMullen, Minneapolis; David B. Wamstad, Roseville, both of Minn.

[73] Assignee: Honeywell Inc., Minneapolis, Minn.

[21] Appl. No.: 248,134

[22] Filed: Mar. 30, 1981

[51] Int. Cl.³ .............................................. G01L 9/06
[52] U.S. Cl. ................................ 73/721; 73/DIG. 4; 338/4
[58] Field of Search ................ 73/720, 721, 726, 727, 73/708, 756, DIG. 4; 338/4, 3, 42

[56] References Cited

U.S. PATENT DOCUMENTS 3,482,197 12/1969 Kondo et al. ......................... 73/726
4,127,840 11/1978 House .................................... 73/727
4,321,578 3/1982 Nagasu et al. ......................... 73/721

Primary Examiner—Donald O. Woodiel
Attorney, Agent, or Firm—Roger W. Jensen

[57] ABSTRACT

A stress sensitive semiconductor unit comprising means for supporting a very long elongated cylindrical support member having a stress sensitive semiconductor die bonded to one end thereof, a plurality of metal elongated terminal pins held in rigid hermetically sealed insulative relationship with said header, first and second insulative spacers having central bores sized larger than the outer diameter of the glass tubular member and positioned in axial proximity to one another with the first spacer being abutted against the header and with the second spacer being sized so that the outer axial end thereof is substantially in planer register with the active face of the semiconductor die, the ends of the terminal pins being mechanically and electrically connected to conductive areas or portions on the face of the second spacer.

5 Claims, 6 Drawing Figures

DIFFERENTIAL PRESSURE TO ELECTRICAL SIGNAL TRANSDUCER

BRIEF SUMMARY OF THE INVENTION

The subject invention is related to the prior patent application of David B. Wamstad, Filed Feb. 4, 1981, Ser. No. 231,546, and entitled "STRESS SENSITIVE SEMICONDUCTOR UNIT AND HOUSING MEANS THEREFORE". To explain and clarify, said previously filed patent application discloses a unique mounting means for a stress sensitive semiconductor unit comprising in part a cylindrical support member having a stress sensitive semiconductor die mounted on one face thereof. The arrangement shown and claimed in said copending application functions to substantially isolate the semiconductor die from external stresses.

The present invention also is associated with a semiconductor die mounted at one end of a glass or ceramic cylindrical support member wherein the support member is further characterized by having a very substantial axial length so as to greatly minimize the application of external stresses to the semiconductor die.

Furthermore, the glass cylindrical support member is adapted to be supported by a header or base member through the utilization of a very high hermeticity glass to metal seal comprising in part a tubular metal sleeve wherein one end of the sleeve is mounted on a header or base member and the other end of the sleeve is bonded to one end of the aforesaid very long glass cylindrical support member, the aforesaid glass to metal seal being the subject matter of another copending patent application of David B. Wamstad, Ser. No. 248,135, filed Mar. 30, 1981, and entitled "VERY HIGH HERMETICITY GLASS TO METAL SEAL".

While the very long or elongated glass support tube or cylindrical support member provides the aforesaid advantage of great reduction in stress transmittal, it does introduce several new problems, the most significant of which is the making of electrical connections to the electrical circuit means on the semiconductor die positioned at the end of the cylindrical support member. Also, accurate alignment and positioning of the semiconductor die and terminal pins to allow assembly of the insulative support member becomes much more difficult as the support is lengthened. Long terminal pins are subject to bending. Furthermore, the extended terminal pins tend to dictate large voids into which oil would flow, i.e., cause an increase in oil volume which is very undesirable.

The subject invention therefore may be briefly summarized as an improved stress sensitive semiconductor unit comprising means, e.g., a header or base member for supporting a very long elongated cylindrical support member having a stress sensitive semiconductor die bonded to one end thereof, a plurality of metal elongated terminal pins held in rigid hermetically sealed insulative relationship with said header, a first and a second insulative cylindrically shaped spacer having central bores sized larger than the outer diameter of the glass tubular member and positioned in axial proximity to one another with the first spacer being abutted against the header and with the second spacer being sized so that the outer axial end thereof is substantially in planar register with the active face of the semiconductor die, the ends of the terminal pins being mechanically and electrically connected to conductive areas or portions on the face of the second spacer. Additionally, flexible lead means are provided to electrically connect said conductive portions to electric circuit means on the semiconductor die. Finally, a cover member having a Faraday shield is attached to the outer face of the second spacer.

An additional feature of the present invention is that the cylindrically shaped spacers are of a diameter substantiallly the same as the diameter of the header or the base member so that when the assembled unit is inserted into the reservoir or the like of a meter body, there will be a maximum volume to the unit so as to reduce oil volume and thereby reduce oil expansion problems, as will be understood by those skilled in the art.

DESCRIPTION OF THE PREFERRED EMBODIMENT

Figure 1:
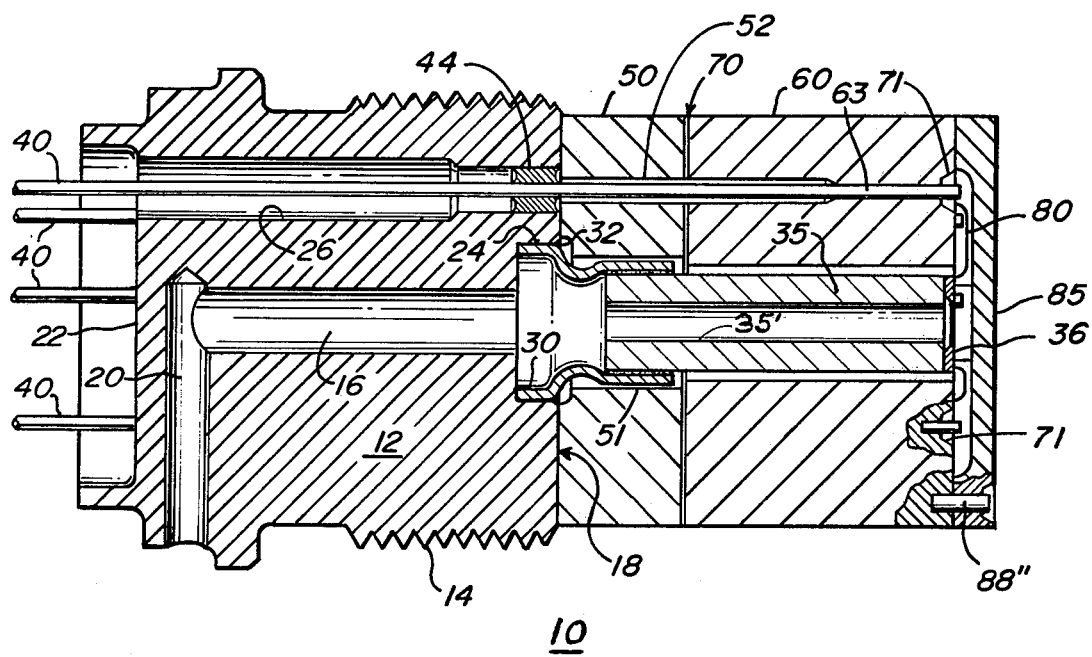
FIG. 1 is a cross sectional view of an assembled differential pressure to electrical signal transducer embodying the present invention, the section being taken along sections lines 1—1 of FIG. 2.
Figure 2:
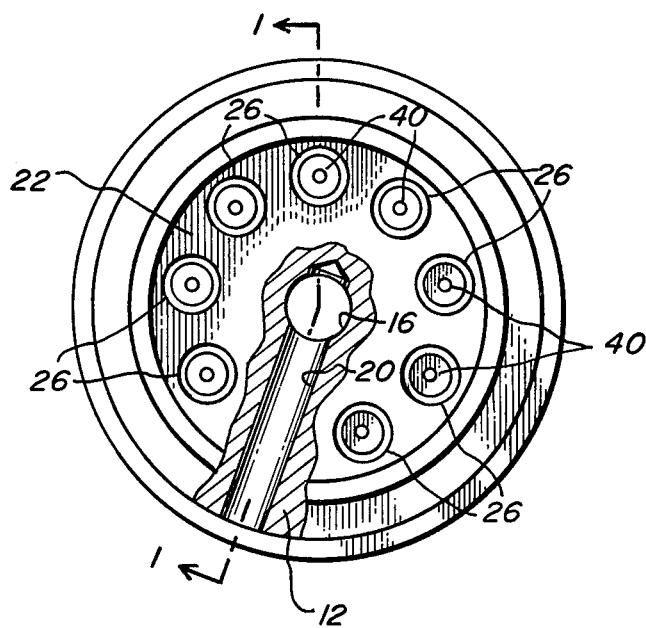
FIG. 2 is an end view of the left side of the apparatus shown in FIG. 1.

Referring to FIG. 1, the reference numeral 10 designates a differential pressure to electrical signal transducer comprising a header or base member 12 of a suitable material such as steel and having a generally cylindrical exterior shape with attachment means such as threads 14 on a portion of the outer circumferential surface thereof so as to facilitate the mechanical attachment of the base member to a meter body or other apparatus (not shown) for association with a fluid under pressure, the magnitude of which is desired to be measured. The header 12 has a centrally located longitudinally extending pressure bore 16 extending from a first end face 18 thereof to a radially extending bore 20 which extends from the longitudinal bore 16 to the said outer surface of the header adjacent to a second end face 22 of the header. In addition, the header or base member 12 has a circular recess 24 concentrically positioned with respect to the longitudinal pressure port 16. The header further has a plurality of longitudinal extending terminal pin bores 26 extending from said first end face to said second end face. The bores 26 are spaced apart from the pressure port bore 16 and are arranged generally in a circle as is best shown in FIG. 2.

A circular-shaped hollow metal sleeve member 30 has a first end positioned in said circular recess 24. The sleeve 30 is sized with respect to the recess 24 so that a press fit is obtained and the sleeve is held in position by appropriate means such as brazing at a temperature of approximately 2000° F. represented by reference numeral 32.

The sleeve 30 has a second end thereof adapted to receive a cylindrically shaped axially elongated glass tubular member 35 having a longitudinal bore 35' therethrough. Tubular member 35 has its circumferential surface adjacent a first (left as shown in FIG. 1) end metalized with an appropriate metal coating. The hermetic seal between tubular member 35 and sleeve 30 is preferably of the very high hermeticity seal shown and claimed in my aforesaid copending patent application, entitled "VERY HIGH HERMETICITY GLASS TO MEAL SEAL".

A plurality of metal elongated terminal pins 40 are positioned in said plurality of terminal pin bores 26 and are held in rigid hermetically sealed and mechanical relationship with respect to said header 12 by a plurality of glass insulators 44. In production the terminal pins have appropriate cylindrically shaped glass beads slipped down along the extent thereof to the position shown in FIG. 1 where they are retained during a heating process which melts the glass 44 and fuses it so as to bond both the pins 40 and housing 12 to thus position the metal pins with respect to the metal housing 12. Thus the pins are electrically insulated from header 12 and the seal is hermetic.

The preferred material for the terminal pins 40 is nickel plated 446 stainless steel.

The terminal pins extend somewhat to the left of header 12 as shown in FIG. 1 so as to permit the connection thereto of external circuitry not shown, and also extend far to the right of the header 12 as shown in FIG. 1 to a point approximately coplanar with the exposed or outboard surface of a semiconductor die 36 bonded to the end of 35 as is taught and shown in substantial detail in said copending application, Ser. No. 231,546.

A first insulative cylindrically shaped spacer 50 having a central bore 51 of circular cross section and a plurality of longitudinally extending terminal pin bores 52 is loosely fitted over the extended terminal pins 40 and with the central bore thereof loosely encompassing the second end of the sleeve member 30. Spacer 50 may be made out of 94% Al O ceramic.

Figure 3:
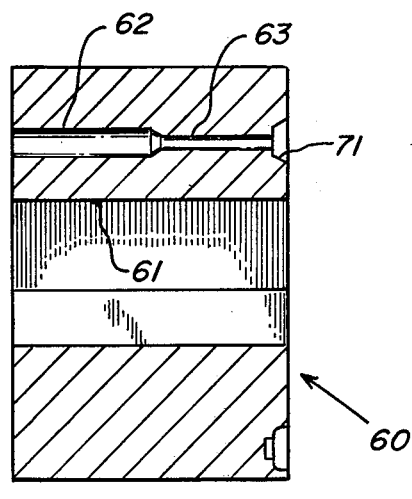
FIG. 3 is a cross sectional view of the second or outer spacer member as viewed along section line 3—3 of FIG. 4.
Figure 4:
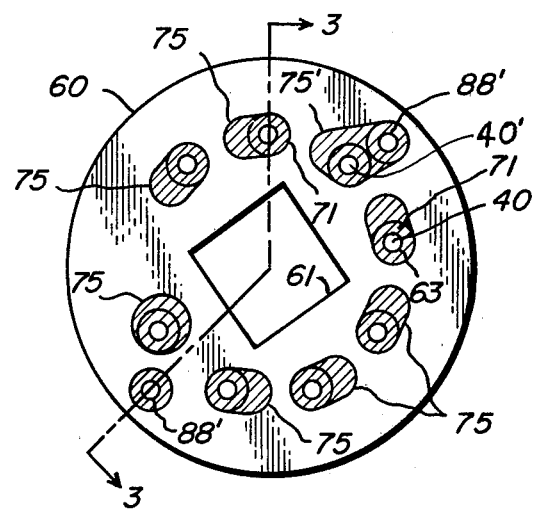
FIG. 4 is an end view of the right side of the spacer shown in FIG. 3.

A second insulative cylindrically shaped spacer 60 which may also be made of 94% Al O ceramic and is positioned in axial abutment with the first spacer 50. Both spacers 50 and 60 have an outer diameter substantially the same as the minor thread diameter of the header member 12. Spacer 60 is also shown in FIGS. 3 and 4. Spacer 60 has a square-shaped central bore 61 which is sized larger than the outer diameter of the glass tubular member 35 so as to surround the latter without physical contact. Spacer 60 further has a plurality of longitudinally extending terminal pin bores 62 which for the most part are somewhat larger in diameter than the terminal pins 40 but which have a final portion 63 which are only slightly larger than the diameter of the terminal pins 40 so that when the spacer 60 is inserted or slipped onto the extending terminal pins 40 and the cylindrical member 35, there is a snug fit between the pins 40 and the bores 63, this tight fit providing a mechanical positioning or support of the insulative support member 60 on the ends of the pins 40, the positioning being such that a slight axial clearance is left between the abutting adjacent axial faces of spacers 50 and 60, this clearance or gap being designated in FIG. 1 by the reference numeral 70. The purpose of gap 70 is to permit a certain amount of expansion and contraction of the apparatus shown in FIG. 1 and specifically the pins 40 and supports 50 and 60 over a wide range of temperature environments without having any axial shifting between th pins 40 and the support 60. Gap 70 should be at least approximately 0.002 minimum clearance.

To further anchor or mechanically secure the support 60 to the ends of pins 40, the support 60 has a plurality of conical solder holding recesses 71 in the outboard axial face thereof coextensive or concentric with the bores 63.

Referring to FIG. 4, the plurality of conical solder recesses 71 are shown prior to spacer 60 being inserted over the pins 40. FIG. 4 also depicts a plurality of metalized portions 75 which metalize the surfaces of the conical recesses 71 and also extends somewhat along the axial face of the spacer 60. The metalized film on the surfaces of the recesses 71 permits good bonds between the solder (not shown) and the pins 40 and the support 60. The portion of the metalized portion 75 on the axial face of support 60 permits the bonding thereto of a plurality of leads 80 (see FIG. 1), the leads 80 extending between such individual metalized portion 75 and individual circuit elements (not shown) on the outboard face of the semiconductor die 36.

Figure 5:
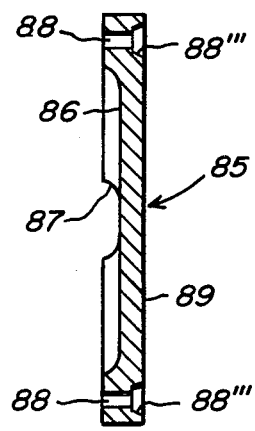
FIG. 5 is a cross sectional view of the cover plate.

A cover 85 shown in FIG. 5, has a circular shape with one end face recessed as at 86 so as to provide an enclosure for the leads 80 and the ends of the pins 40 (see FIG. 1). Cover 85 further has a pair of side port 87, one of which is shown in FIG. 5. Ports 87 permits the free passage therethrough of oil or other hydraulic fluid, which fluid then impinges upon the top surface of the semiconductor die 36. Cover 85 also has a pair of countersunk holes 88 and the nonrecessed face thereof has a metalized coating thereon constituting a Faraday shield 89. In FIG. 1 the cover 85 is shown assembled with the other apparatus where two pins 88" pass through apertures 88 and extend into companion bores 88' in spacer 60 (see FIG. 4). The countersunk bores 88''' are also metalized so that after the cover is assembled as shown in FIG. 1 then solder means are use to bond the cover 85 to the pins 88" and electrically connect the pins 88''' to the Faraday shield 89. Further, one of the pins 88" (see FIG. 1) is electrically connected (see FIG. 4) to one of the metalized portions 75' on the face of the spacer 60 and thus to one of the terminal pins 40 (identified in FIG. 4 as terminal pin 40') so that the Faraday shield may be electrically connected to external circuitry.

In operation, the apparatus shown in FIG. 1 is adapted to be fastened into a meter body or other equivalent device associated with a pair of differential pressures to be measured such as, for example, a fluid flowing through a pipe where it is desired to know the volume of fluid flow so a venturi plate is provided with pressure ports being positioned, as is well known by those skilled in the art, adjacent to the venturi. Thus, one of said pressures would be applied into the vertical port 20 of transducer 10 and from thence through the longitudinal port 16, sleeve 30 and bores 35' of the hollow support 35 to the underside of the semiconductor die 36. The other pressure to be measured would be applied through ports 87 of cover 85 so as to impinge, as aforesaid, on the top side or outboard side of the semiconductor die 36. The die 36 has a centrally located pressure responsive portion in register with bore 35' which responds mechanically to the differential pressure applied thereto so as to provide appropriate electrical responses, e.g., piezoresistively, which responses are then electrically communicated to external circuitry through the leads 80 and terminal pins 40.

Figure 6:
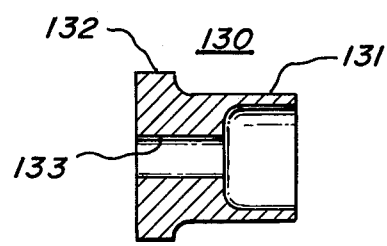
FIG. 6 is a cross sectional view of an alternate means for connecting the glass tube to the header.

FIG. 6 shows an alternate form of sleeve to be used for very high pressure applications. The sleeve 30 shown in FIG. 1 may collapse under extremely high pressures, depending of course on the thickness of the sleeve material. The sleeve shown in FIG. 6 is identified by reference numeral 130 comprising a first end 131 having side walls which are fairly thin and generally the same thickness as the sleeve shown in FIG. 1. It is this portion 131 that would be hermetically sealed to the metallized end of the support tube 35 according to the aforesaid teaching of the copending patent application entitled "VERY HIGH HERMETICITY GLASS TO METAL SEAL". The other end, however, of the sleeve 130 is characterized by having much thicker side walls, the other diameter 132 being selected so as to provide a press fit into recess 24 of the header member 12. A relatively small diameter bore 133 is provided so as to permit fluidic pressures to be transmitted thereto from port 20 to the underside of said semiconductor die 36. Thus, the sleeve 130 shown in FIG. 6 has much heavier construction in the mid-portion thereof subjected to the pressure differential and such heavier construction will permit the device to perform in a satisfactory manner even with extremely high pressure differentials.

While I have described a preferred embodiment of my invention, it will be understood that the invention is limited only by the scope of the following claims:

We claim:

1. A differential pressure to electrical signal transducer comprising:
   (a) a header or base member having attachment means on an outer surface thereof to facilitate connection of said header member to a meter body or housing member, said header having a centrally located longitudinal pressure port bore extending from a first end face thereof to a radial bore which extends from said longitudinal bore to said outer surface adjacent to a second end face thereof, said header having a circular recess in said first end face concentrically with said pressure port bore, and said header having a plurality of longitudinal extending terminal pin bores extending from said first end face to said second end face and spaced from said pressure port bore;
   (b) a circular shaped hollow metal sleeve member having a first end positioned in said circular recess and hermetically bonded to said header and a second end adopted to receive a cylindrically shaped member;
   (c) a round cylindrically shaped axially elongated glass tubular member having its circumferential surface adjacent a first end thereof metalized and a thin wafer-like semiconductor die hermetically attached to the other end thereof, said metalized end of said tubular member being inserted into said second end of said sleeve member and hermetically attached thereto, and said semiconductor die having (i) a centrally located pressure responsive portion positioned in register with the hollow bore of said tubular member and (ii) a plurality of electrical circuit elements on a face thereof adapted to be connected to external circuit means;
   (d) a plurality of elongated metal terminal pins positioned in said plurality of terminal pin bores of said header and held in rigid hermetically sealed relationship with said header by insulative means, said pins extending beyond both of said end faces of said header member;
   (e) a first insulative cylindrically shaped spacer having (i) a central circular bore larger in diameter than the outer diameter of said second end of said sleeve, and (ii) a plurality of longitudinally extending terminal pin bores, said first spacer being loosely fitted over said terminal pins extending beyond said first end face of said header member and said second end of said sleeve;
   (f) a second insulative cylindrically shaped spacer having (i) an outer diameter substantially the same as the outer diameter of said first insulative spacer, (ii) a central bore sized larger than the outer diameter of said glass tubular member, and (iii) a plurality of longitudinally extended terminal pin bores spaced from said central bore, said terminal pin bores terminating at a first axial end face of said second cylindrically shaped spacer with (i) a reduced diameter sized to snuggly embrace said terminal pins, and (ii) conical solder holding recesses formed in said first axial end face, said end face having thereon a plurality of metalized portions including and surrounding each of said plurality of said solder holding recesses, and said second insulative spacer being assembled with elements (a) to (e) above by being positioned axially adjacent to an end face of said first insulative spacer and further (i) so that said central bore thereof encompasses concentrically said glass tubular member, the axial length of said second spacer being such that, after said assembly, said first axial end face thereof is in substantial planer register with said face of said die having said plurality of circuit elements, (ii) so that the portion of said terminal pins extending beyond said first insulative spacer extend through said plurality of terminal pin bores thereof and the end of said terminal pins are positioned in said conical recesses, and (iii) so that the second end face thereof is slightly spaced from an end face of said first insulative spacer;
   (g) means selectively soldering said ends of said terminal pins to said metalized portions at the location of the respective solder holding recess so as to electrically connect each of said terminal pins to an individual metalized portion, said soldering step further providing (i) a hermetic seal between each terminal pin and said second insulative spacer, and (ii) a rigid mechanical connection between said terminal pins and said second insulative spacer so that, inter alia, said metalized portions are held in substantially fixed axial relationship with said plurality of electrical circuit elements of said semiconductor die; and
   (h) flexible lead means interconnecting said metalized portions and said plurality of circuit elements; and cover means including Faraday shield means attached to said first axial end face of said second spacer, said cover means having aperture means therein to permit the flow therethrough of fluid so as to impinge against said pressure responsive portion of said semiconductor die.

2. A differential pressure to electrical signal transducer comprising:
   (a) a header member having attachment means to facilitate connection of said header member to a housing member, said header having (i) a centrally located longitudinal pressure port bore extending from a first end face thereof (ii) a circular recess in said first end face concentrically with said pressure port bore, and (iii) a plurality of longitudinal extending terminal pin bores extending from said first end face therethrough to a second end face;

(b) a circular shaped hollow metal sleeve member having a first end positioned in said circular recess and hermetically bonded to said header member and a second end adopted to receive a cylindrically shaped member;

(c) a round cylindrically shaped axially elongated insulative tubular member having its circumferential surface adjacent a first end thereof metalized and a thin wafer-like semiconductor die hermetically attached to the other end thereof, said metalized end of said tubular member being inserted into said second end of said sleeve member and hermetically attached thereto, and said semiconductor die having (i) a centrally located pressure responsive portion positioned in register with the hollow bore of said tubular member and (ii) a plurality of electrical circuit elements on a face thereof adapted to be connected to external circuit means;

(d) a plurality of elongated metal terminal pins positioned in said plurality of terminal pin bores of said header and held in rigid hermetically sealed relationship with said header by insulative means, said pins extending beyond both of said end faces of said header member;

(e) a first insulative spacer having a central bore therethrough sized larger than the outer diameter of said second end of said sleeve, and a plurality of longitudinally extending terminal pin bores, said first spacer being loosely fitted over said terminal pins extending beyond said first end face of said header member and said second end of said sleeve;

(f) a second insulative spacer having (i) a central bore therethrough sized larger than the outer diameter of said insulative member, and (ii) a plurality of longitudinally extended terminal pin bores spaced from said central bore, said terminal pin bores terminating at a first axial end face of said second spacer with said end face having thereon a plurality of metalized portions respectively adjacent to said terminal pin boxes, and said second insulative spacer being assembled with elements (a) to (e) above by being positioned axially adjacent to an end face of said first insulative spacer and further so that (i) said central bore thereof encompasses said insulative tubular member, the axial length of said second spacer being selected so that, after said assembly, said first axial end face thereof is in substantial planar register with said face of said die having said plurality of circuit elements, and (iii) said second end face of said second spacer is slightly spaced from an axial end face of said first insulative spaces;

(g) means electrically connecting said ends of said terminal pins to said metalized portions so as to electrically connect each of said terminal pins respectively to an individual metalized portion, and means providing (i) a hermetic seal between each terminal pin and said second insulative spacer, and (ii) a rigid mechanical connection between said terminal pins and said second insulative spacer so that, inter alia, said metalized portions are held in substantially fixed axial relationship with said plurality of electrical circuit elements of said semiconductor die; and (h) means electrically interconnecting said metalized portions and said plurality of circuit elements.

3. Apparatus of claim 2 further characterized by said first end of said hollow metal sleeve member having a relatively thick wall of metal whereby to withstand high pressure differentials without collapsing.

4. Apparatus of claim 2 whereby said first and second insulative spacers are spaced apart by at least 0.002 in.

5. Apparatus of claim 1 further characterized by said Faraday shield means is connected by one of said metalized portions to one of said terminal pins so as to permit connection of external circuitry to said Faraday shield.

* * * * *